(12) United States Patent
Chen et al.

(10) Patent No.: US 12,389,445 B2
(45) Date of Patent: Aug. 12, 2025

(54) COMMUNICATION DEVICES AND METHODS FOR RANDOM ACCESS REPORTING

(71) Applicant: Apple Inc., Cupertino, CA (US)

(72) Inventors: Yuqin Chen, Beijing (CN); Dawei Zhang, Saratog, CA (US); Gurunadha Rao Kota, Bengaluru (IN); Haijing Hu, Los Gatos, CA (US); Siddharth Verma, San Diego, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/890,189

(22) Filed: Aug. 17, 2022

(65) Prior Publication Data
US 2023/0086511 A1 Mar. 23, 2023

(30) Foreign Application Priority Data
Sep. 16, 2021 (IN) .............................. 202141042004

(51) Int. Cl.
*H04W 74/00* (2009.01)
*H04W 74/0833* (2024.01)

(52) U.S. Cl.
CPC ..... *H04W 74/004* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2014/0241285 A1 | 8/2014 | Pang et al. | |
| 2020/0015266 A1* | 1/2020 | Yan | H04W 74/0833 |
| 2020/0099499 A1* | 3/2020 | Yeo | H04L 1/0045 |
| 2020/0107235 A1 | 4/2020 | Peisa et al. | |
| 2020/0128588 A1 | 4/2020 | Xiong | |
| 2022/0330280 A1* | 10/2022 | Uzeda Garcia | H04W 72/1263 |

FOREIGN PATENT DOCUMENTS

| | | |
|---|---|---|
| WO | 2018137245 A1 | 8/2018 |
| WO | 2020187274 A1 | 9/2020 |
| WO | 2021006688 A1 | 1/2021 |
| WO | 2021109388 A1 | 6/2021 |

OTHER PUBLICATIONS

Japan Patent Application No. 2022-142057, Office Action, Jan. 29, 2024, 4 pages.
3GPP TS 38.211 V16.6.0, 3rd Generation Partnership Project; Technical Specification Group Radio Access Network; NR; Physical channels and modulation (Release 16), Jun. 30, 2021, pp. 44-65.
Further Consideration on NR RACH Preamble Sequence and Preamble Format for Capacity Enhancement, CATT, R1-1715789, 3GPP TSG RAN WG1 Meeting NR#3, Sep. 18-21, 2017, 28 pages.

(Continued)

*Primary Examiner* — Minh Trang T Nguyen
(74) *Attorney, Agent, or Firm* — Kilpatrick Townsend & Stockton LLP

(57) ABSTRACT

The present application relates to devices and components including apparatus, systems, and methods for reporting random access configuration information in wireless networks.

20 Claims, 7 Drawing Sheets

(56) References Cited

OTHER PUBLICATIONS

European Patent Application No. 22193954.9, Extended European Search Report, Jan. 31, 2023, 13 pages.
India Patent Application No. 202141042004, First Examination Report, Jul. 11, 2023, 7 pages.
Japan Patent Application No. 2022-142057, Office Action, Aug. 21, 2023, 7 pages.
3rd Generation Partnership Project; Technical Specification Group Radio Access Network; NR; Radio Resource Control RRC protocol specification (Release 16), 3GPP TS 38.331 V16.5.0, Jun. 2021, 959 pages.
3rd Generation Partnership Project; Technical Specification Group Radio Access Network; NR; Physical channels and modulation (Release 16), 3GPP TS 38.211 V16.6.0, Jun. 2021, 134 pages.
3rd Generation Partnership Project; Technical Specification Group Radio Access Network; Study on RAN-centric data collection and utilization for LTE and NR (Release 16), 3GPP TR 37.816 V16.0.0, Jul. 2019, 35 pages.
3GPP TS 38.211 V16.6.0, 3rd Generation Partnership Project; Technical Specification Group Radio Access Network; NR; Physical Channels and Modulation (Release 16), Jun. 2021, 134 pages.
3GPP TS 38.331 V16.5.0, 3rd Generation Partnership Project; Technical Specification Group Radio Access Network; NR; Radio Resource Control (RRC) Protocol Specification (Release 16), Jul. 6, 2021, 959 pages.
China Patent Application No. 202211087005.3, Office Action, Jun. 28, 2025, 11 pages.

\* cited by examiner

COMMUNICATION DEVICES AND METHODS FOR RANDOM ACCESS REPORTING

CROSS-REFERENCE TO RELATED APPLICATION

This application claims the benefit of India Patent Application No. 202141042004, filed on Sep. 16, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related collection, analysis, and utilization of radio access network (RAN)-centric data.

DETAILED DESCRIPTION

Figure 1:
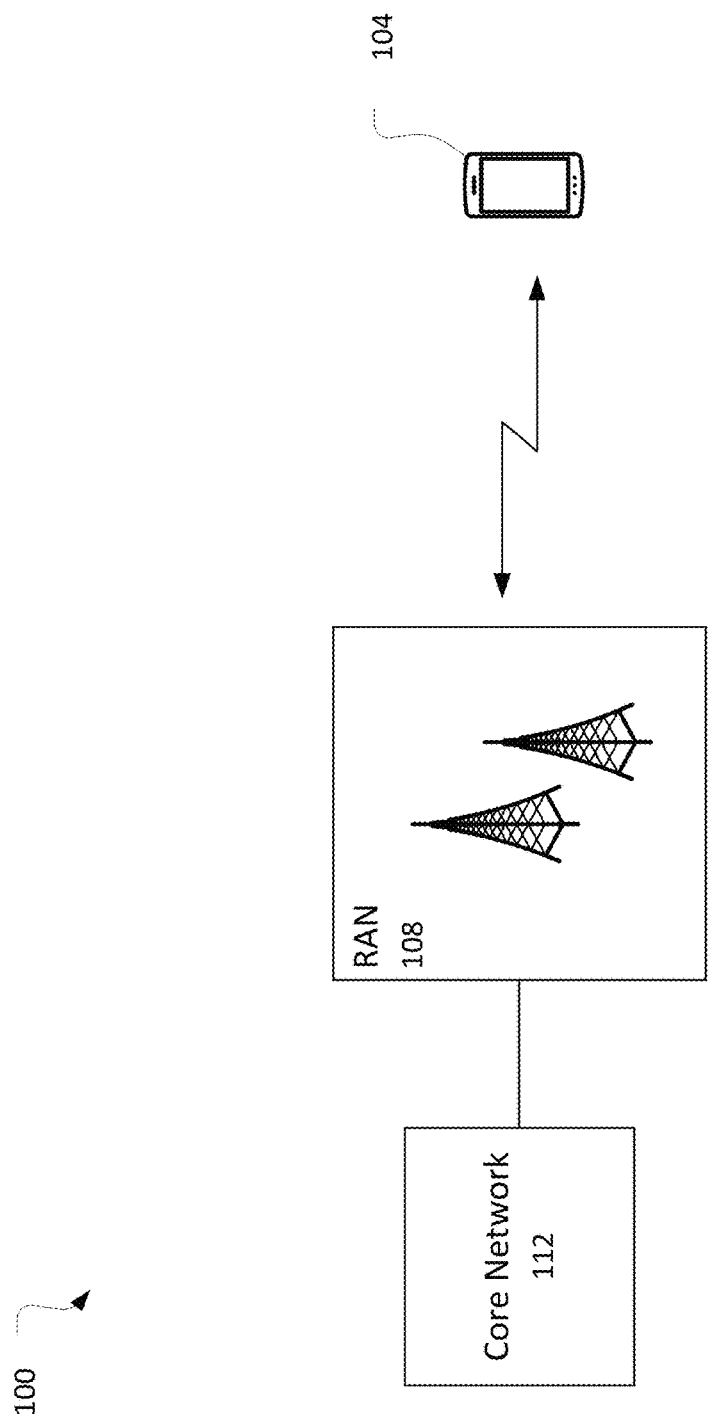
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "(A)B" means (B) or (A and B), thus, A is optional.

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base stations of a radio access network (RAN) 108. The UE 104 and the base station(s) may communicate over air interfaces compatible with 3GPP TSs such as those that define Fifth Generation (5G) NR system standards. The base station(s) may be a next generation node B (gNB) to provide one or more 5G New Radio (NR) cells to provide NR user plane and control plane protocol terminations toward the UE 104. In other embodiments, the base stations may provide one or more cells of previous generations (for example, Long Term Evolution (LTE) cells) or later generations (for example, $6^{th}$ generation (6G) cells).

The network environment 100 may further include a core network (CN) 112. For example, the CN 112 may comprise a $5^{th}$ Generation Core network (5GC). The CN 112 may be coupled to the base station(s) of the RAN 108 via a fiber optic or wireless backhaul. The CN 112 may provide functions for the UE 104 via the RAN 108. These functions may include managing subscriber profile information, subscriber location, authentication of services, or switching functions for voice and data sessions.

The UE 104 may access the RAN 108 using a random access (RA) procedure. The RA procedure may be used for a variety of services including initial access from a radio resource control (RRC) idle mode, transition from RRC inactive to RRC connected, handover, downlink/uplink data arrival while the UE 104 is out-of-sync, uplink data arrival for the UE 104 without physical uplink control channel resource (PUCCH) allocation, on-demand system information, beam failure recovery, scheduling request failure, synchronous reconfiguration, and establishing time alignment during addition of secondary cells.

An RA procedure may be a contention-based random access (CBRA) procedure or a contention-free random-access (CFRA) procedure. For a CBRA procedure, the UE 104 may select an RA preamble from a pool of preambles and transmit the selected RA preamble to a base station in a message 1 (MSG1) transmission. The base station may respond with a random access response, which may be referred to as a message 2 (MSG2) transmission, that provides an uplink resource allocation. The UE 104 may then transmit a common control channel (CCCH) transmission, which may be referred to as a message 3 (MSG3) transmission. The base station may receive and decode MSG 3 and transmit a contention resolution message (MSG4). The UE 104 may decode the MSG4 to determine that the base station successfully received the MSG3 transmitted by the UE 104.

For the CFRA procedure, the UE 104 may use an RA preamble specifically assigned to the UE 104 by a base station.

Figure 2:
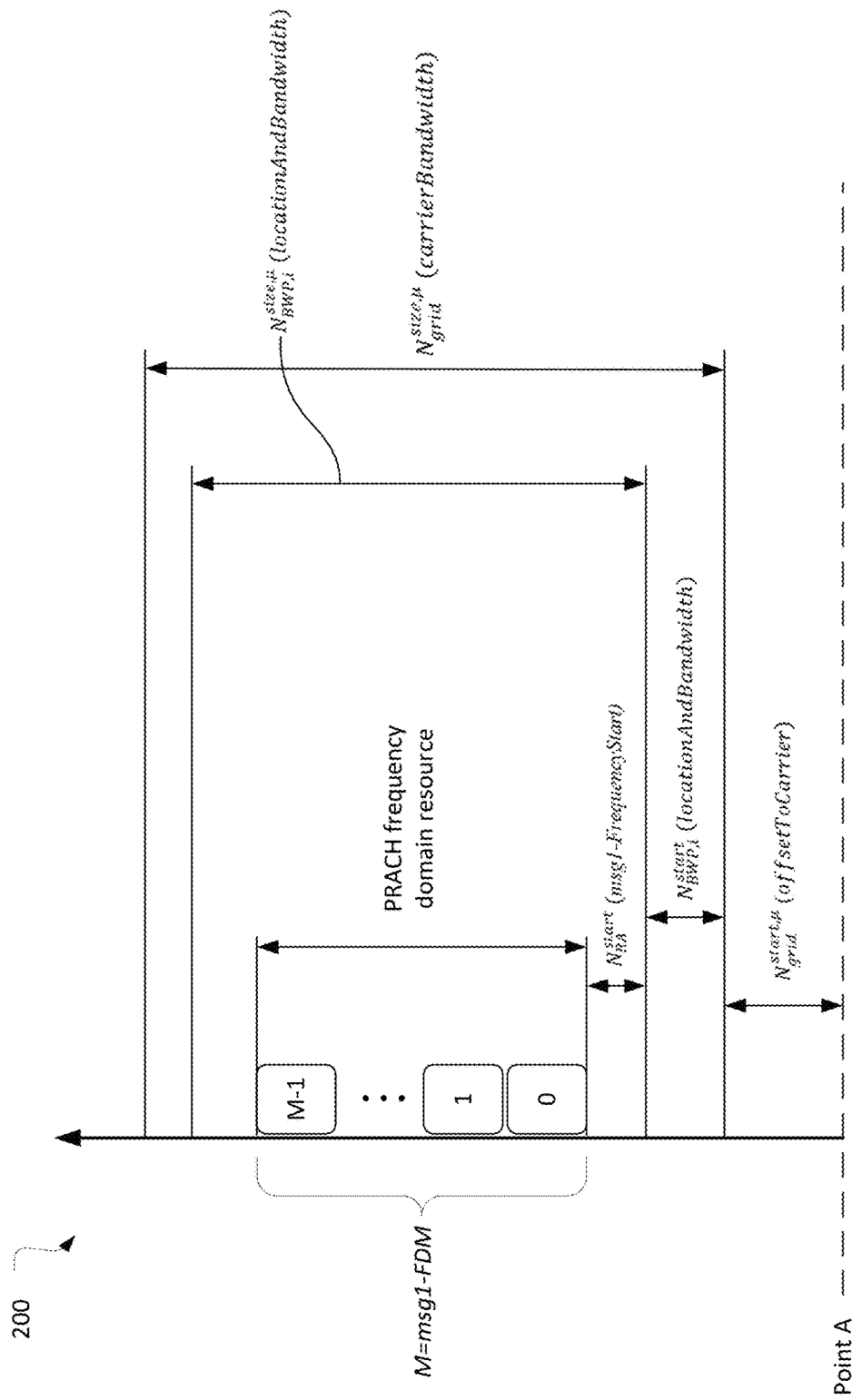
FIG. 2 illustrates a physical random access channel frequency domain resources in accordance with some embodiments.

FIG. 2 illustrates physical random access channel (PRACH) frequency domain resources 200 in accordance with some embodiments. The PRACH frequency domain resources 200 may be defined with respect to an absolute frequency point A (or simply "Point A") that defines an absolute frequency position of a reference resource block. Point A may correspond to a center of a lowest subcarrier, subcarrier 0, that belongs to common resource block (RB) 0.

An offset-to-carrier (offsetToCarrier) value, $N_{grid}^{start,\mu}$, may define an offset in the frequency domain between Point A and a lowest usable subcarrier of the carrier. The offset-to-carrier value may be provided in a number of physical resource blocks (PRBs).

A carrier bandwidth (carrierBandwidth) value, $N_{grid}^{size,\mu}$, may define a size of the carrier in PRBs.

A location and bandwidth (locationAndBandwidth) start value, $N_{BWP,i}^{start}$, may define a start of a frequency domain location of a bandwidth part having the RA resources to be used by the UE 104.

A location and bandwidth (locationAndBandwidth) size value, $N_{BWP,i}^{size,\mu}$, may define a size of the bandwidth part having the RA resources to be used by the UE 104.

A MSG1 frequency start (msg1-FrequencyStart) value, $N_{RA}^{start}$, may provide an offset of a lowest PRACH transmission occasion in frequency domain with respect to the lowest PRB of the bandwidth part (PRB 0).

A MSG1 frequency division multiplexing (FDM) (msg1-FDM) value, M, may indicate a number of PRACH transmission occasions FDMed in one time instance.

The UE 104 may determine the number of PRB(s) for each PRACH transmission occasion based on a network configuration that defines a preamble length, a MSG1 subcarrier spacing, and a subcarrier spacing for a physical uplink shared channel (PUSCH).

Table 1 below, which corresponds to Table 6.3.3.2-1 of 3GPP TS 38.211 v16.6.0 (2021-06), describes supported combinations of preamble sequence length ($L_{RA}$), subcarrier spacing for PRACH ($\Delta f_{RA}$) for PRACH, subcarrier spacing for PUSCH ($\Delta f_{RA}$), and a number of resource blocks occupied by each PRACH transmission occasion ($N_{RB}^{RA}$). The subcarrier spacing for the PUSCH may be needed given that the allocation of the number of occupied RBs is expressed in number of RBs for the PUSCH.

TABLE 1

| $L_{RA}$ | $\Delta f_{RA}$ for PRACH | $\Delta f$ for PUSCH | $N_{RB}^{RA}$, allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |
| 571 | 30 | 15 | 96 | 2 |
| 571 | 30 | 30 | 48 | 2 |

TABLE 1-continued

| $L_{RA}$ | $\Delta f_{RA}$ for PRACH | $\Delta f$ for PUSCH | $N_{RB}^{RA}$, allocation expressed in number of RBs for PUSCH | $\bar{k}$ |
|---|---|---|---|---|
| 571 | 30 | 60 | 24 | 2 |
| 1151 | 15 | 15 | 96 | 1 |
| 1151 | 15 | 30 | 48 | 1 |
| 1151 | 15 | 60 | 24 | 1 |

As can be seen, the sequence lengths of the RA preambles may include values of 839, 139, 571, or 1151. For purposes of the description of various embodiments, a preamble with a sequence length of 139 may be referred to as a short preamble, a preamble with a sequence length of 571 may be referred to as a medium preamble, a preamble with a sequence length of 839 may be referred to as a long preamble, and a preamble with a sequence length of 1151 may be referred to as an extra-long preamble.

The long preambles, which may be listed as the first six rows of Table 1, may be the only preambles associated with SCS of 1.25 and 5 kHz. For long preambles, the RAN 108 may provide RA configuration information to the UE 104 using a PRACH configuration index rather than RRC signaling. Table 2, which corresponds to a portion of Table 6.3.3.2-3 of 3GPP TS 38.211, provides an example of random access configurations based on the PRACH configuration index. The network may provide the UE 104 with a PRACH configuration index and the UE 104 may access a table similar to Table 2 to determine a preamble length and MSG1 subcarrier spacing.

TABLE 2

| PRACH Configuration Index | Preamble format | $n_f$ mod $x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| 11 | 0 | 4 | 1 | 9 | 0 | — | — | 0 |
| 12 | 0 | 2 | 1 | 1 | 0 | — | — | 0 |
| 13 | 0 | 2 | 1 | 4 | 0 | — | — | 0 |
| 14 | 0 | 2 | 1 | 7 | 0 | — | — | 0 |
| 15 | 0 | 2 | 1 | 9 | 0 | — | — | 0 |
| 16 | 0 | 1 | 0 | 1 | 0 | — | — | 0 |
| 17 | 0 | 1 | 0 | 4 | 0 | — | — | 0 |
| 18 | 0 | 1 | 0 | 7 | 0 | — | — | 0 |
| 19 | 0 | 1 | 0 | 1, 6 | 0 | — | — | 0 |
| 20 | 0 | 1 | 0 | 2, 7 | 0 | — | — | 0 |
| 21 | 0 | 1 | 0 | 3, 8 | 0 | — | — | 0 |
| 22 | 0 | 1 | 0 | 1, 4, 7 | 0 | — | — | 0 |
| 23 | 0 | 1 | 0 | 2, 5, 8 | 0 | — | — | 0 |
| 24 | 0 | 1 | 0 | 3, 6, 9 | 0 | — | — | 0 |
| 25 | 0 | 1 | 0 | 0, 2, 4, 6, 8 | 0 | — | — | 0 |
| 26 | 0 | 1 | 0 | 1, 3, 5, 7, 9 | 0 | — | — | 0 |
| 27 | 0 | 1 | 0 | 0, 1, 2, 3, 4, 5, 6, 7, 8, 9 | 0 | — | — | 0 |
| 28 | 1 | 16 | 1 | 1 | 0 | — | — | 0 |

TABLE 2-continued

| PRACH Configuration Index | Preamble format | $n_f$ mod $x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 29 | 1 | 16 | 1 | 4 | 0 | — | — | 0 |
| 30 | 1 | 16 | 1 | 7 | 0 | — | — | 0 |
| 31 | 1 | 16 | 1 | 9 | 0 | — | — | 0 |

For preambles other than the long preamble, the RAN 108 may explicitly indicate the MSG1 subcarrier spacing using RRC signaling, which, in previous networks, is limited to 15 kHZ and 30 kHZ in Frequency Range 1 (FR1) and 60 kHZ and 120 kHZ in Frequency Range 2 (FR2). FR1 may correspond to a frequency range of 410-7,125 megahertz (mHz) and FR2 may correspond to a frequency range of 24,250-52,600 mHz.

In some embodiments, the UE 104 may provide a base station of the RAN 108 with RA information. This information may be provided to a base station other than the base station that configured the UE 104 with the RA information. This may occur after the UE 104 establishes an RRC connection with another base station as the result of an RLF or a successful cell reselection.

A base station may use reported RA information to improve operation of a RACH in a number of aspects. For example, RACH operation may be improved by: reducing RACH collision probability and, therefore, reducing access set up delays; reducing data resuming delays from an uplink unsynchronized state; reducing handover delays; reducing transition delays from an inactive state; reducing beam failure recovery delays; assuring a RACH is performed on a most suitable downlink beam and, therefore, avoiding unnecessary power ramping; avoiding unnecessary interference in the network; and reducing the experience delay and UE energy consumption.

RA reporting may be used in self organizing networks (SON) or minimization of drive tests (MDT) scenarios. The RA information may be carried in a radio link failure (RLF) report, a connection establishment failure (CEF) report, or a normal successful RA report list (RA-ReportList). Various embodiments of the disclosure describe RA resource reporting that is carried in RLF reports or normal RA reports.

Existing RA resource reporting includes, within an RA information common IE, information on BWP resources and PRACH resources (for both CFRA and CBRA) within the BWP. The BWP resources may be defined by an absoluteFrequencyPointA field, a locationAndBandwidth field, and a subcarrierSpacing field. These values may correspond to parameters shown and described above with respect to FIG. 2.

For short preambles, a network can retrieve RA resources based on the following fields of the RA-InformationCommon IE: msg1-FrequencyStart; msg1-SubcarrierSpacing, and msg1-FDM (and msg1-FrequencyStartCFRA; msg1-SubcarrierSpacingCFRA, and msg1-FDMCFRA for CFRA scenarios). However, due to the limitation of existing msg1-subcarrierspacing field abstract syntax notation 1 (ASN.1) values, a UE cannot report, and the network cannot retrieve, the RA resource for long preambles. Thus, embodiments describe signaling aspects that allow the UE 104 to fully report RA resources to base stations of the RAN 108.

Figure 3:
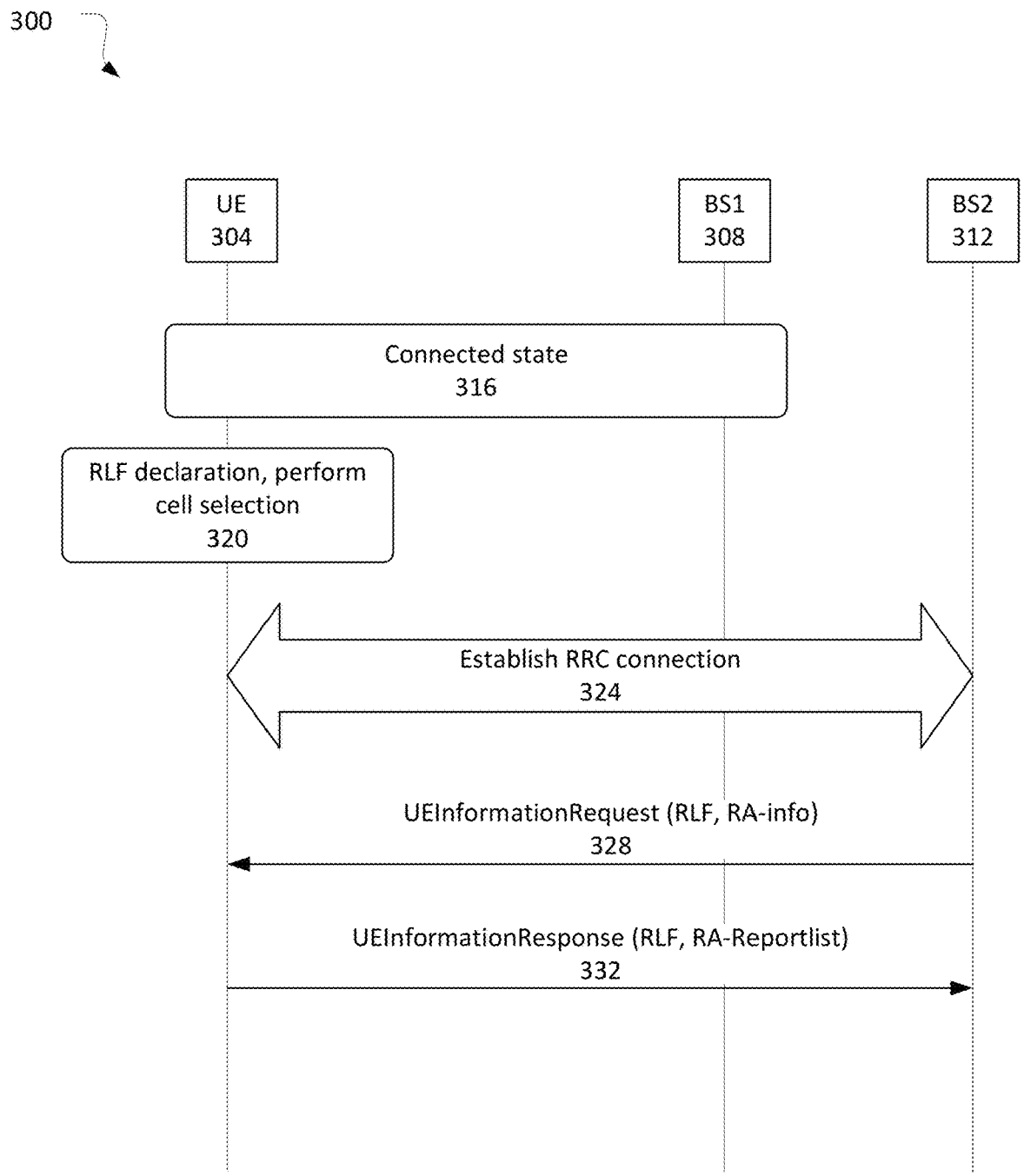
FIG. 3 illustrates a flow diagram that describes reporting random access information in accordance with some embodiments.

FIG. 3 illustrates a flow diagram 300 that describes reporting RA information in an RLF report or a normal RA report in accordance with some embodiments.

The flow diagram 300 may be described with respect to a UE 304, base station 1 (BS1) 308, and base station 2 (BS2) 312. The UE 304 may correspond to and be substantially interchangeable with UE 104, and BS1 308 and BS2 312 may be one of the base stations of RAN 108.

At 316, the UE 304 may be in a connected state with the BS1 308. The BS1 308 may configure the UE 304 with an RA configuration that includes information that allows the UE 304 to determine a number of PRBs to be used in each PRACH transmission occasion. For example, the RA configuration may include indications of the preamble length, MSG1 subcarrier spacing, and subcarrier spacing for PUSCH.

At 320, the UE 304 may declare an RLF and perform cell selection. The cell selection process may result in the UE 304 selecting BS2 312. At 324, the UE 304 may establish an RRC connection with the BS2 312. The RRC connection may be established by the UE 304 performing an RRC connection setup or an RRC reestablishment procedure.

The UE 304 may provide an indication, during the RRC connection establishment, that the UE has RLF/RA information that may be of interest to the BS2 312. While the BS1 308 may have provided the UE 304 with the RA configuration, the BS2 312 may not have knowledge of the RA configuration.

If, at 324, the RRC connection is established by the RRC connection setup procedure, the UE 304 may provide an indication that it has RLF/RA information in an RRC setup complete message. If the RRC connection is established by the RRC reestablishment procedure, the UE 304 may provide an indication that it has RLF/RA information in an RRC reestablishment complete message. In other embodiments, other RRC messages may be used to transmit the indication that the UE 304 has RLF/RA information.

In some embodiments, the UE 304 may provide the indication by setting an RLF information available (rlf-InfoAvailable) field to true. The RLF information available field may be included within a UE measurement available (UE-MeasurementsAvailable) information element (IE).

At 328, the BS2 312 may request the UE 304 to report the RLF/RA information by transmitting a message with a UE information request (UEInformationRequest) IE. The UE information request IE may include an RA report request (ra-ReportReq) field set to 'true' or an RLF report request (rlf-ReportReq) field set to 'true,' as desired.

At 332, the UE 304 may transmit the requested information in a message having an RLF report or a normal RA report that is included in a UE information response (UEInformationResponse) IE. The UE information response IE may include a normal RA report carried in an RA report list (ra-ReportList) or an RLF report (rlf-Report).

Existing RA reports only report absoluteFrequencyPointA, which may not be sufficient for the network to retrieve the real resource location of a BWP. To address these shortcomings, RA reports in accordance with some embodiments may include an OffsetToCarrier field that allows the UE 104 to report back the corresponding offset-to-carrier value for the subcarrier spacing of UL BWP from network configuration in the RA-InformationCommon IE. For example, the ASN.1 text of the RA InformationCommon IE, which may be found in 3GPP TS 38.331 v16.5.0 (2021-06), may be updated with the underlined portion as follows:

```
RA-InformationCommon::=   SEQUENCE {
   absoluteFrequencyPointA      ARFCN-ValueNR,
   locationAndBandwidth         INTEGER (0..37949),
   subcarrierSpacing            SubcarrierSpacing,
   msg1-FrequencyStart          INTEGER (0..maxNrofPhysicalResourceBlocks-1) OPTIONAL,
   msg1-FrequencyStartCFRA      INTEGER (0..maxNrofPhysicalResourceBlocks-1) OPTIONAL,
   msg1-SubcarrierSpacing       SubcarrierSpacing          OPTIONAL,
   msg1-SubcarrierSpacingCFRA   SubcarrierSpacing          OPTIONAL,
   msg1-FDM                     ENUMERATED {one, two, four, eight}   OPTIONAL,
   msg1-FDMCFRA                 ENUMERATED {one, two, four, eight} OPTIONAL,
   perRAInfoList                PerRAInfoList-r16,
   offsetToCarrier              INTEGER (0..2199)
   ...
}
```

The offsetToCarrier field may indicate the offset in frequency domain between Point A (lowest subcarrier of common RB 0) and the lowest usable subcarrier on this carrier in number of PRBs (using the subcarrierSpacing defined for this carrier), corresponding to subcarrierSpacing. In some embodiments, the value of the offset-to-carrier may be an integer from 0-2199 as shown above.

The OffsetToCarrier may be configured per SCS, via an scs-SpecificCarrierList, which is carried inside a FrequencyInfoUL IE.

Various options may be used to address UE reporting the subcarrier spacing for long preambles. In a first option, the current msg1-SubcarrierSpacing field may be extended to carry the SCSs that correspond to the long preamble. For example, msg1-SubcarrierSpacing field may be extended to include options for 1.25 kHz SCS and 5 kHz. The msg1-SubcarrierSpacing field of the RA-InformationCommon IE may include a SubcarrierSpacing IE that may be used to determine the subcarrier spacing. In some embodiments, restrictions applicable to certain frequencies, channels, or signals may be clarified in the fields that use the SubcarrierSpacing IE. To accommodate the SCS of the long preambles, the ASN.1 text of the SubcarrierSpacing IE may be updated with the underlined portion as follows:

```
-- ASN1START
-- TAG-SUBCARRIERSPACING-START
SubcarrierSpacing ::=   ENUMERATED {kHz15, kHz30, kHz60,
    kHz120, kHz240, kHz1.25, kHz5, spare1}
```

-continued

```
-- TAG-SUBCARRIERSPACING-STOP
-- ASN1STOP
```

The 1.25 kHz and 5 kHz values added to the SubcarrierSpacing IE may replace spare values currently in the SubcarrierSpacing IE as defined in 3GPP TS 38.331.

In another option for addressing UE reporting the subcarrier spacing for long preambles, one or more fields may be added on msg1-SubcarrierSpacing to report the SCS for long preambles. This may provide a flexible and extensible aspect of addressing the RA reporting of MSG1 subcarrier spacing. The ASN.1 text of the RA-InformationCommon IE may be updated to include the underlined portion as follows:

```
RA-InformationCommon::=   SEQUENCE {
   absoluteFrequencyPointA      ARFCN-ValueNR,
   locationAndBandwidth         INTEGER (0..37949),
   subcarrierSpacing            SubcarrierSpacing,
   msg1-FrequencyStart          INTEGER (0..maxNrofPhysicalResourceBlocks-1) OPTIONAL,
   msg1-FrequencyStartCFRA      INTEGER (0..maxNrofPhysicalResourceBlocks-1) OPTIONAL,
   msg1-SubcarrierSpacing       SubcarrierSpacing          OPTIONAL,
   msg1-SubcarrierSpacingCFRA   SubcarrierSpacing          OPTIONAL,
   msg1-FDM                     ENUMERATED {one, two, four, eight}   OPTIONAL,
   msg1-FDMCFRA                 ENUMERATED {one, two, four, eight} OPTIONAL,
   perRAInfoList                PerRAInfoList-r16,
   msg1-SubcarrierSpacingLP     SubcarrierSpacingLP        OPTIONAL,
   ...
}
```

The MSG1 subcarrier spacing field of the RA-InformationCommon IE may include a long-preamble subcarrier spacing (SubcarrierSpacingLP) IE that determines the subcarrier spacing for long preambles. In some embodiments, restrictions applicable to certain frequencies, channels, or signals may be clarified in the fields that use the SubcarrierSpacingLP IE. The ASN.1 text of the SubcarrierSpacingLP IE may be as follows:

```
-- ASN1START
-- TAG-SUBCARRIERSPACING-START
SubcarrierSpacingLP ::=   ENUMERATED {kHz1.25, kHz5, spare6,
spare5, spare4, spare3, spare2, spare1}
-- TAG-SUBCARRIERSPACING-STOP
-- ASN1STOP
```

As can be seen, the SubcarrierSpacingLP IE may include only the SCSs that correspond to the long preamble, for example, SCS 1.25 kHz and 5 kHz. In other embodiments, the SubcarrierSpacingLP IE may be expanded to include additional/alternative SCSs.

In another option to address UE reporting of subcarrier spacing for long preambles, the UE 104 may echo back the prach-ConfigurationIndex and the network may retrieve MSG1 subcarrier spacing for the long preamble based on tables such as Tables 1 and 2.

The ASN.1 text of the RA-InformationCommon IE may be updated to include the underlined portion as follows:

```
RA-InformationCommon::=   SEQUENCE {
    absoluteFrequencyPointA       ARFCN-ValueNR,
    locationAndBandwidth          INTEGER (0..37949),
    subcarrierSpacing             SubcarrierSpacing,
    msg1-FrequencyStart           INTEGER (0..maxNrofPhysicalResourceBlocks-1)
OPTIONAL,
    msg1-FrequencyStartCFRA       INTEGER (0..maxNrofPhysicalResourceBlocks-1)
OPTIONAL,
    msg1-SubcarrierSpacing        SubcarrierSpacing           OPTIONAL,
    msg1-SubcarrierSpacingCFRA    SubcarrierSpacing           OPTIONAL,
    msg1-FDM                      ENUMERATED {one, two, four, eight}   OPTIONAL,
    msg1-FDMCFRA                  ENUMERATED {one, two, four, eight}
OPTIONAL,
    perRAInfoList                 PerRAInfoList-r16,
    prach-ConfigurationIndex      INTEGER (0..262)            OPTIONAL,
    ...
}
```

The prach-ConfigurationIndex may include an integer value from 0-262 that corresponds to a PRACH configuration index of a predefined table such as, for example, Table 6.3.3.2-3 of 3GPP TS 38.211. In this manner, the base station may be able to derive the MSG1 subcarrier spacing and any other information that may be relevant from the predefined table.

In some embodiments, the above-described options are not, or cannot be used, to report RA information for long preamble. In these embodiments, the network may interpret an absence of the msg1-SubcarrierSpacing field in the RA report as an indication that the long preamble was used. The network may then know that either the 1.25 kHz SCS or the 5 kHz SCS was used, although it may not know the exact one that was used without additional information.

Figure 4:
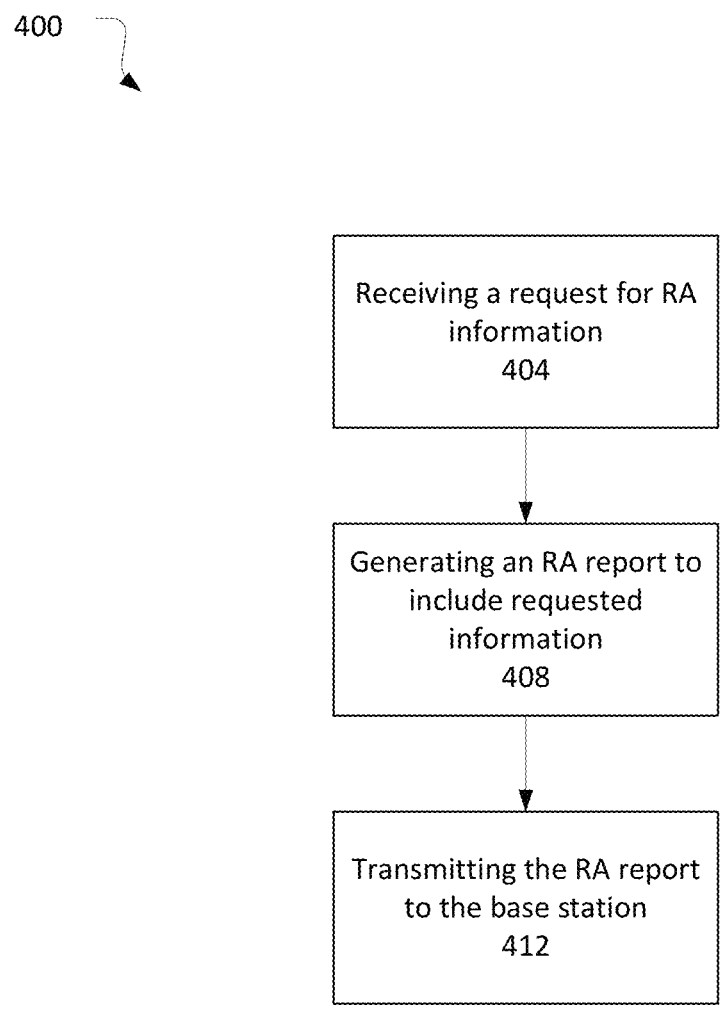
FIG. 4 illustrates an operational flow/algorithmic structure in accordance with some embodiments.

FIG. 4 provides an operation flow/algorithmic structure 400 in accordance with some embodiments. The operation flow/algorithmic structure 400 may be performed or implemented by a UE such as, for example, UE 104, or components thereof, for example, baseband processor circuitry 604A.

The operation flow/algorithmic structure 400 may include, at 404, receiving a request for RA information. The base station may transmit the request for RA information after receiving an indication that the UE includes RA information. The indication may be provided to the base station as part of an RRC connection establishment.

The request for RA information may be a UE information request message that includes an RA report request or an RLF report request.

The operation flow/algorithmic structure 400 may further include, at 408, generating an RA report to include the requested information. In some embodiments, the RA report may be generated to include an offset-to-carrier value to indicate a frequency offset between Point A (e.g., a lowest subcarrier of a common resource block 0) and a lowest usable subcarrier of the carrier. The value may be an integer from 0-2199 and may indicate the frequency offset in a number of PRBs. The frequency offset may correspond to a subcarrier spacing defined for the carrier.

The RA report may additionally/alternatively include an indication of subcarrier spacing for a MSG1 transmission with a long RACH preamble. The subcarrier spacing may be 1.25 kHZ or 5 kHz in some embodiments. The indication of the subcarrier spacing may be in a subcarrier spacing IE that is defined in a manner to provide subcarrier spacing for both short preambles and long preambles (and, potentially, medium and extra-long preambles); or may be in a subcarrier spacing IE that is defined in a manner to provide subcarrier spacings only for long preambles.

The operation flow/algorithmic structure 400 may further include, at 412, transmitting the RA report to the base station. The RA report may be included in a UE information response message transmitted in response to the UE information request message.

Figure 5:
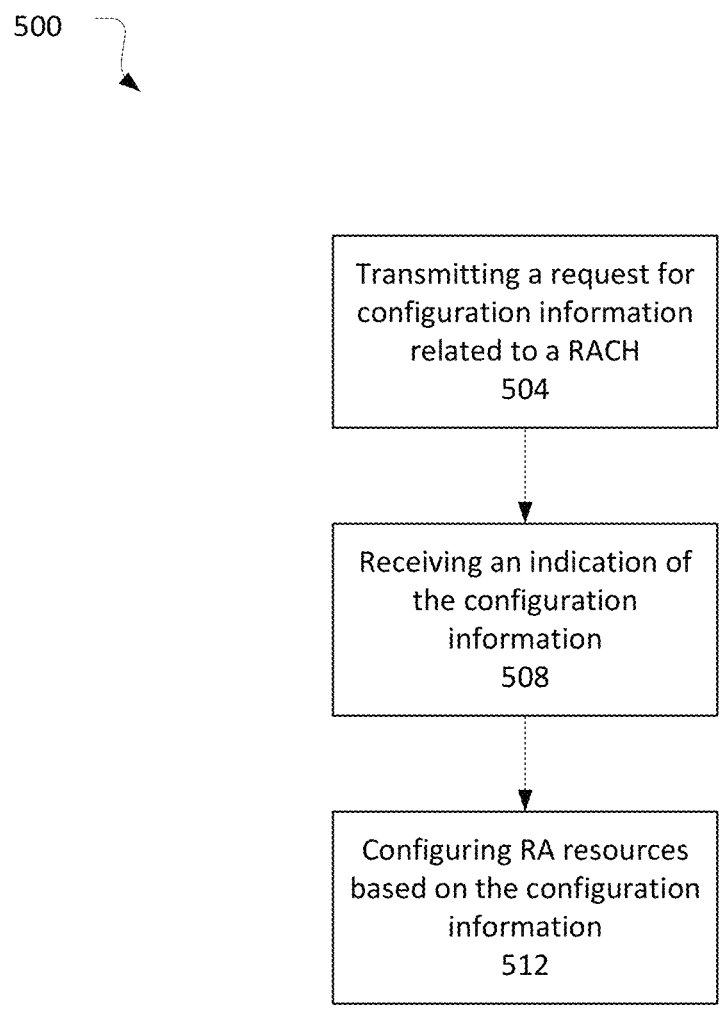
FIG. 5 illustrates another operational flow/algorithmic structure in accordance with some embodiments.

FIG. 5 provides an operation flow/algorithmic structure 500 in accordance with some embodiments. The operation flow/algorithmic structure 500 may be performed or implemented by a base station such as, for example, a base station of RAN 108, or components thereof, for example, baseband processor circuitry 704A.

The operation flow/algorithmic structure 500 may include, at 504, transmitting a request for information related to a RACH. The request for information may be included in a UE information request message that includes an RA report request or an RLF report request.

The operation flow/algorithmic structure 500 may further include, at 508, receiving an indication of the configuration information. The indication may be received in a UE information response message that is transmitted as a response to the UE information request. In some embodiments, the indication of the configuration information may be included directly in the UE information response message. For example, the UE information response message may include an RA information common IE that indicates an offset-to-carrier value or a MSG1 subcarrier spacing for a long preamble. In other embodiments, the indication may be an index that is used by the base station to access the configuration information. For example, the base station may receive a PRACH index from the UE and may use the PRACH index to access a predefined table to determine the configuration information related to the RACH.

The operation flow/algorithmic structure 400 may further include, at 412, configuring RA resources based on the configuration information. The RA resources may be configured for the UE that transmitted the indication of the configuration information or for other UEs in serving cells provided by the base station. The RA resources may be configured to improve operation of a RACH in the serving cell. For example, improved operation may be obtained by: reducing RACH collision probability and, therefore, reducing access set up delays; reducing data resuming delays from an uplink unsynchronized state; reducing handover delays; reducing transition delays from an inactive state; reducing beam failure recovery delays; assuring a RACH is performed on a most suitable downlink beam and, therefore, avoiding unnecessary power ramping; avoiding unnecessary interference in the network; or reducing the experience delay and UE energy consumption.

Figure 6:
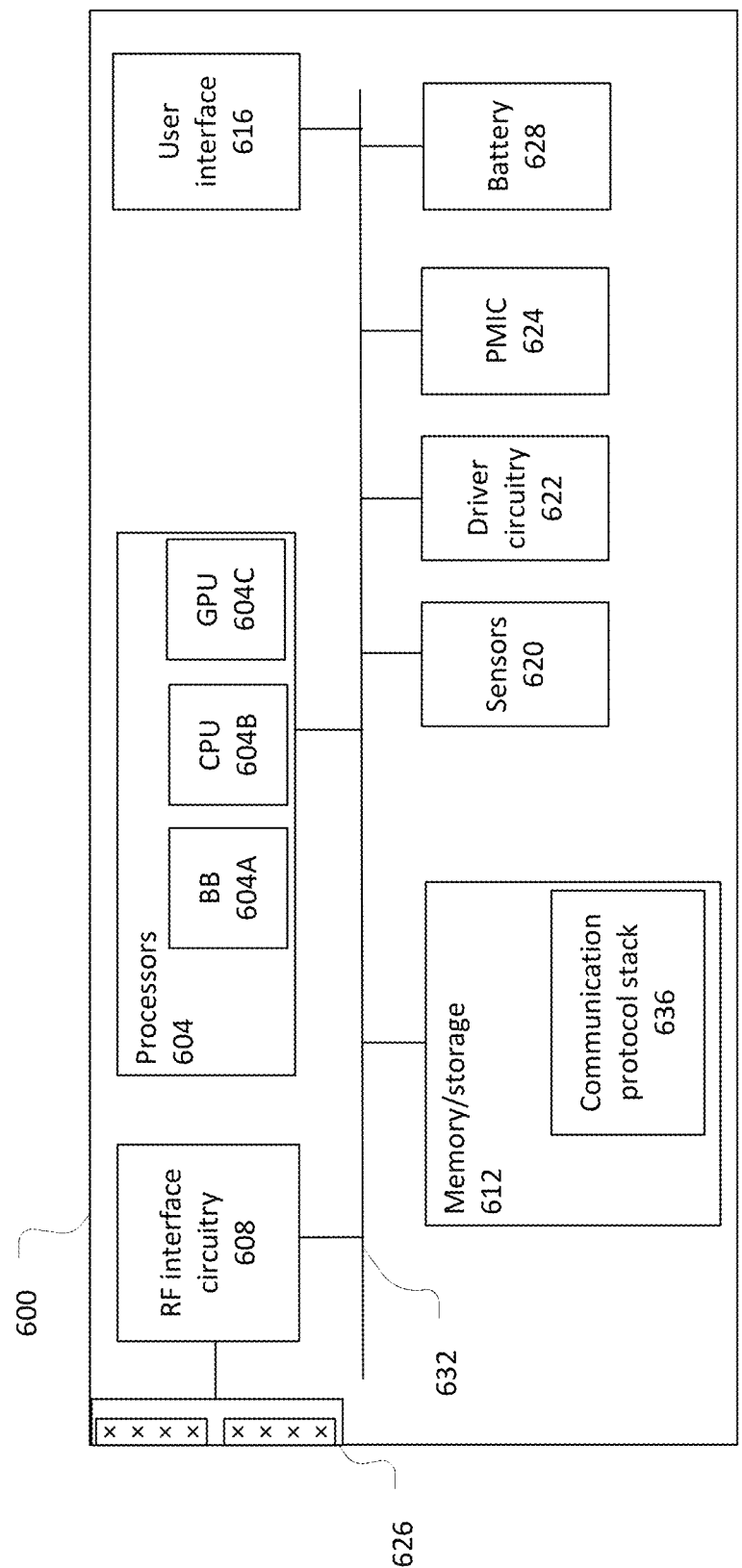
FIG. 6 illustrates a user equipment in accordance with some embodiments.

FIG. 6 illustrates a UE 600 in accordance with some embodiments. The UE 600 may be similar to and substantially interchangeable with UE 104 of FIG. 1.

The UE 600 may be any mobile or non-mobile computing device, such as, for example, mobile phones, computers, tablets, XR devices, glasses, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 600 may include processors 604, RF interface circuitry 608, memory/storage 612, user interface 616, sensors 620, driver circuitry 622, power management integrated circuit (PMIC) 624, antenna structure 626, and battery 628. The components of the UE 600 may be implemented as integrated circuits (ICs), portions thereof, discrete electronic devices, or other modules, logic, hardware, software, firmware, or a combination thereof. The block diagram of FIG. 6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, or optical connection that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein.

In some embodiments, the baseband processor circuitry 604A may access a communication protocol stack 636 in the memory/storage 612 to communicate over a 3GPP compatible network. In general, the baseband processor circuitry 604A may access the communication protocol stack 636 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 608.

The baseband processor circuitry 604A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 include any type of volatile or non-volatile memory that may be distributed throughout the UE 600. In some embodiments, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 608 may include transceiver circuitry and radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 626 and proceed to filter and amplify (with a low-noise amplifier) the signal. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various embodiments, the RF interface circuitry 608 may be configured to transmit/receive signals in a manner compatible with NR access technologies.

The antenna 626 may include antenna elements to convert electrical signals into radio waves to travel through the air and to convert received radio waves into electrical signals.

The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, or phased array antennas. The antenna 626 may have one or more panels designed for specific frequency bands including bands in FR1 or FR2.

The user interface circuitry 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 600.

The sensors 620 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 622 may include software and hardware elements that operate to control particular devices that are embedded in the UE 600, attached to the UE 600, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

In some embodiments, the PMIC 624 may control, or otherwise be part of, various power saving mechanisms of the UE 600 including DRX as discussed herein.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

Figure 7:
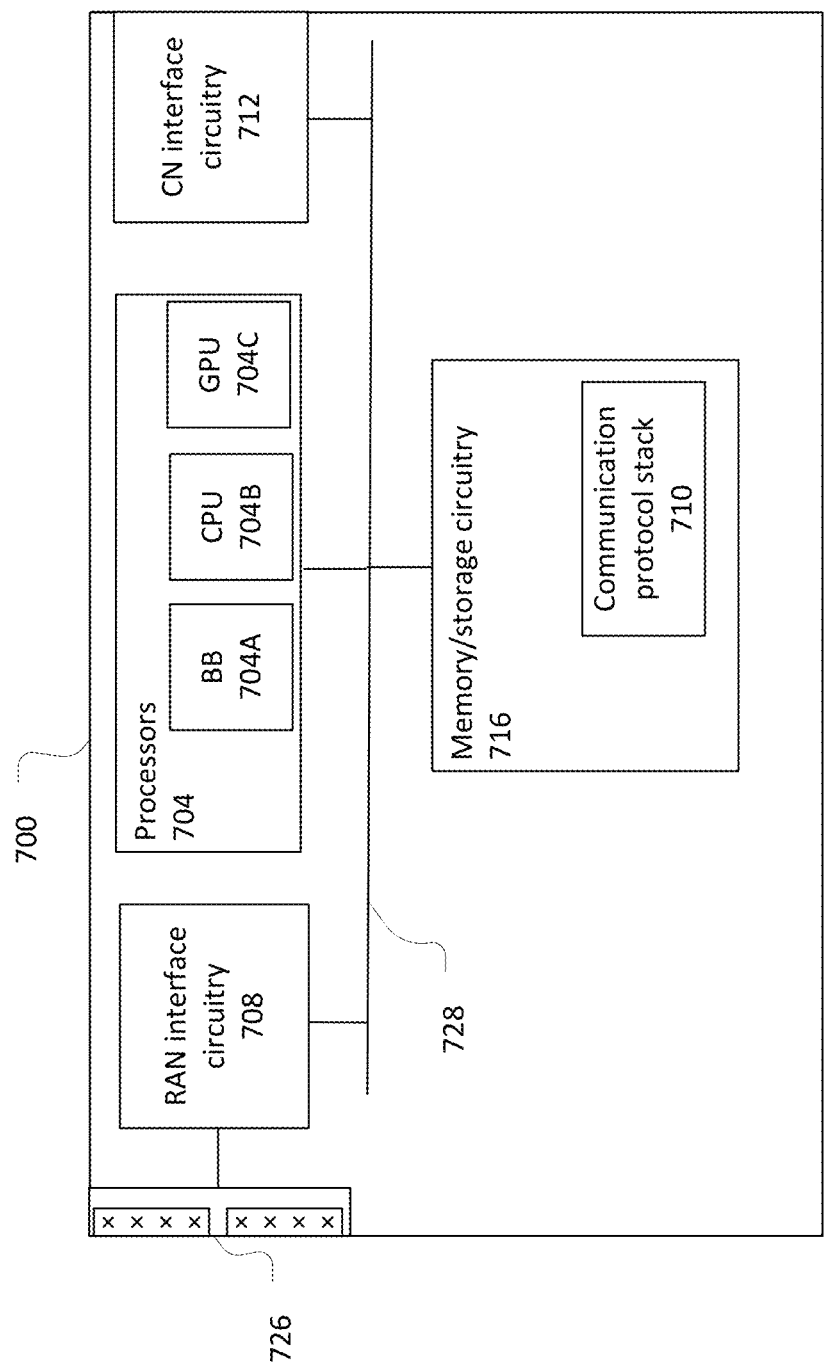
FIG. 7 illustrates a network device in accordance with some embodiments.

FIG. 7 illustrates a network device 700 in accordance with some embodiments. The network device 700 may be similar to and substantially interchangeable with base station of RAN 108 of FIG. 1.

The network device 700 may include processors 704, RF interface circuitry 708 (if implemented as a base station), core network (CN) interface circuitry 712, memory/storage circuitry 716, and antenna structure 726 (if implemented as a base station).

The components of the network device 700 may be coupled with various other components over one or more interconnects 728.

The processors 704, RF interface circuitry 708, memory/storage circuitry 716 (including communication protocol stack 710), antenna structure 726, and interconnects 728 may be similar to like-named elements shown and described with respect to FIG. 6.

The CN interface circuitry 712 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 700 via a fiber optic or wireless backhaul. The CN interface circuitry 712 may include one or more dedicated processors or FPGAs to communicate using one or more of the aforementioned protocols. In some implementations, the CN interface circuitry 712 may include multiple controllers to provide connectivity to other networks using the same or different protocols.

In some embodiments, the base station 700 may be coupled with transmit receive points (TRPs) using the antenna structure 726, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method comprising: receiving, from a base station, a request for random access (RA) information; generating an RA report to include an offset-to-carrier field with a value to indicate a frequency offset between a lowest subcarrier of common resource block 0 and a lowest usable subcarrier of a carrier; and transmitting the RA report to the base station.

Example 2 includes a method of example 1 or some other example herein, wherein the value is an integer from 0 to 2199.

Example 3 includes the method of example 1 or some other example herein, wherein the value is to indicate the frequency offset in a number of physical resource blocks.

Example 4 includes a method of example 1 or some other example herein, wherein the frequency offset corresponds to a subcarrier spacing defined for the carrier.

Example 5 includes the method of example 1 or some other example herein, further comprising: generating the RA report to include an RA information common information element (IE) that includes the offset-to-carrier field.

Example 6 includes the method of example 1 or some other example herein, wherein the lowest subcarrier of common resource block 0 is point A.

Example 7 includes the method of example 1 or some other example herein, wherein generating the RA report comprises: generating a radio link failure (RLF) report or a successful RA-report list.

Example 8 includes a method comprising: receiving, from a base station, a request for random access (RA) information; generating an RA report to include a subcarrier spacing field with a value to indicate a subcarrier spacing of 1.25 kilohertz (kHz) or 5 kHz for RA resources; and transmitting the RA report to the base station.

Example 9 includes the method of example 8 some other example herein, wherein the subcarrier spacing is for a random access channel (RACH) preamble having a sequence length of 839.

Example 10 includes a method of example 9 or some other example herein, further comprising: generating the RA report to include an RA information common information element (IE) that includes the subcarrier spacing field.

Example 11 includes a method of example 10 or some other example herein, wherein the subcarrier spacing field is a first subcarrier spacing field and the method further comprises: generating the RA information common IE to include a second subcarrier spacing field with a value to indicate a subcarrier spacing for a RACH preamble having a sequence length of 839.

Example 12 includes the method of example 8 or some other example herein, wherein generating the RA report comprises: generating a radio link failure (RLF) report or a successful RA-report list.

Example 13 includes a method comprising: transmitting, to a user equipment (UE), a request for configuration information related to a random access channel (RACH); and receiving, from the UE, an indication of the configuration information, wherein the configuration information includes a value of a frequency offset between a lowest subcarrier of common resource block 0 and a lowest usable subcarrier of a carrier, or a subcarrier spacing of 1.25 kilohertz (kHz) or 5 kHz for random access resources.

Example 14 includes the method of example 13 or some other example herein, wherein the indication is received in a random access information common information element (IE) that includes an offset-to-carrier field with a value of a frequency offset between a lowest subcarrier of common resource block 0 and a lowest usable subcarrier of a carrier.

Example 15 includes the method of example 13 or some other example herein, wherein the indication is received in a random access information common information element (IE) that includes a subcarrier spacing field with a value to indicate a subcarrier spacing of 1.25 kilohertz (kHz) or 5 kHz for random access resources.

Example 16 includes the method of example 13 or some other example herein, wherein the indication is received in a random access information common information element (IE) that includes a physical random access channel (PRACH) configuration index field that includes a value and the method further comprises: accessing a predefined table based on the value to obtain the configuration information.

Example 17 includes the method of example 16 or some other example herein, wherein the value is an integer value from 0-262.

Example 18 includes the method of example 13 or some other example herein, further comprising: establishing a radio resource control (RRC) connection with the UE; receiving, from the UE, an indication that the UE has information related to the RACH; and transmitting the request in a UE information request message based on the indication that the UE has information related to the RACH.

Example 19 includes the method of example 18 or some other example herein, wherein receiving the indication of the configuration information comprises:

receiving a UE information response message that includes a random access (RA) report with the indication of the configuration information.

Example 20 includes the method of example 13 or some other example herein, further comprising: configuring random access resources within a serving cell based on the configuration information.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   processing circuitry to
   receive, from a base station, a request for random access (RA) information;
   generate an RA report to include a subcarrier spacing field with a value to indicate a subcarrier spacing of 1.25 kilohertz (kHz) or 5 kHz for RA resources; and
   output the RA report for transmission to the base station; and
   interface circuitry coupled with the processing circuitry to enable communication.

2. The apparatus of claim 1, wherein the subcarrier spacing is for a random access channel (RACH) preamble having a sequence length of 839.

3. The apparatus of claim 2, wherein the processing circuitry is to:
   generate the RA report to include an RA information common information element (IE) that includes the subcarrier spacing field.

4. The apparatus of claim 1, wherein the subcarrier spacing field is a first RA-InformationCommon subcarrier spacing (SCS) field
   that is different from a second RA-InformationCommon SCS field that is to indicate a subcarrier spacing of 15 kHz, 30 kHz, 60 kHz, 120 kHz, or 240 kHz.

5. The apparatus of claim 1, wherein the RA report comprises:
   a radio link failure (RLF) report or a successful RA-report list.

6. A method of comprising:
   generating, for transmission to a user equipment (UE), a request for configuration information related to a random access channel (RACH); and
   receiving, from the UE, an indication of the configuration information, wherein the configuration information includes a value of a frequency offset between a lowest subcarrier of common resource block 0 and a lowest usable subcarrier of a carrier, or a subcarrier spacing of 1.25 kilohertz (kHz) or 5 kHz for random access resources.

7. The method of claim 6, wherein the indication is received in a random access information common information element (IE) that includes an offset-to-carrier field with a value of a frequency offset between a lowest subcarrier of common resource block 0 and a lowest usable subcarrier of a carrier.

8. The method of claim 6, wherein the indication is received in a random access information common information element (IE) that includes a subcarrier spacing field with a value to indicate a subcarrier spacing of 1.25 kilohertz (kHz) or 5 kHz for random access resources.

9. The method of claim 6, wherein the indication is received in a random access information common information element (IE) that includes a physical random access channel (PRACH) configuration index field that includes a value and the method further comprises:
   accessing a predefined table based on the value to obtain the configuration information.

10. The method of claim 9, wherein the value is an integer value from 0-262.

11. The method of claim 6, wherein the method further comprises:
    establishing a radio resource control (RRC) connection with the UE;
    receiving, from the UE, an indication that the UE has information related to the RACH; and
    transmitting the request in a UE information request message based on the indication that the UE has information related to the RACH.

12. The method of claim 11, wherein receiving the indication comprises:
    receiving a UE information response message that includes a random access (RA) report with the indication of the configuration information.

13. The method of claim 6, further comprising:
    configuring random access resources within a serving cell based on the configuration information.

14. The method of claim 6, wherein: the configuration information includes a subcarrier spacing of 1.25 kHz or 5 kHz for random access resources; and the subcarrier spacing is for a random access channel (RACH) preamble having a sequence length of 839.

15. The method of claim 6, wherein: the configuration information includes a first RA-InformationCommon subcarrier spacing (SCS) field to indicate an SCS of 1.25 kHz or 5 kHz for random access resources; and the first RA-InformationCommon SCS field is different from a second RA-InformationCommon SCS field that is to indicate an SCS of 15 kHz, 30 kHz, 60 kHz, 120 kHz, or 240 kHz.

16. A method comprising:
receiving, from a base station, a request for random access (RA) information;
generating an RA report to include a subcarrier spacing field with a value to indicate a subcarrier spacing of 1.25 kilohertz (kHz) or 5 kHz for RA resources; and
outputting the RA report for transmission to the base station.

17. The method of claim 16, wherein the subcarrier spacing is for a random access channel (RACH) preamble having a sequence length of 839.

18. The method of claim 17, wherein the method includes:
generating the RA report to include an RA information common information element (IE) that includes the subcarrier spacing field.

19. The method of claim 16, wherein the subcarrier spacing field is a first RA-InformationCommon subcarrier spacing (SCS) field that is different from a second RA-InformationCommon SCS field that is to indicate a subcarrier spacing of 15 kHz, 30 kHz, 60 kHz, 120 kHz, or 240 kHz.

20. The method of claim 16, wherein the RA report comprises:
a radio link failure (RLF) report or a successful RA-report list.

* * * * *